July 10, 1951 R. W. BROWN 2,560,026
METHOD OF ATTACHING AIRPLANE PROPELLER DEICER SHOES
Original Filed June 11, 1941 3 Sheets-Sheet 1
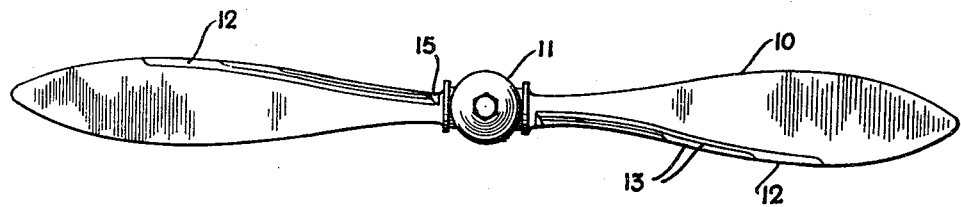
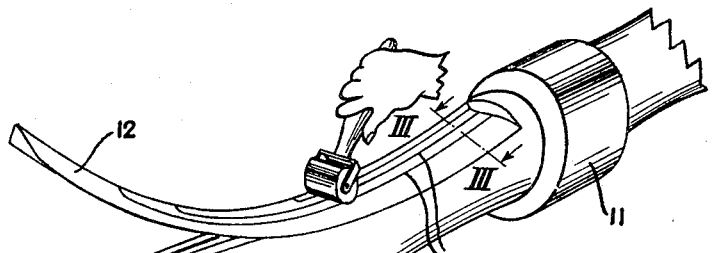
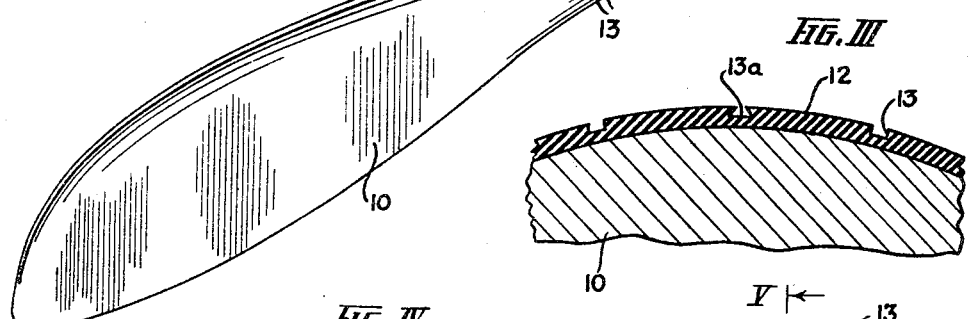
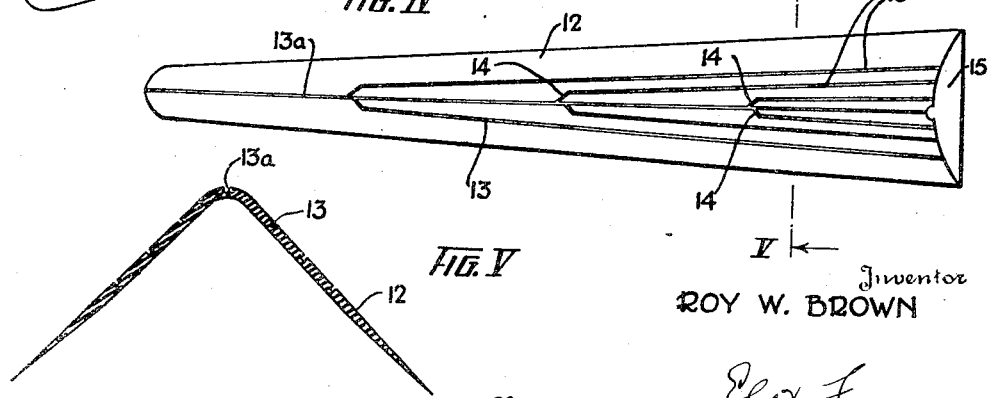
Inventor
ROY W. BROWN July 10, 1951  R. W. BROWN  2,560,026
METHOD OF ATTACHING AIRPLANE PROPELLER DEICER SHOES
Original Filed June 11, 1941   3 Sheets-Sheet 2
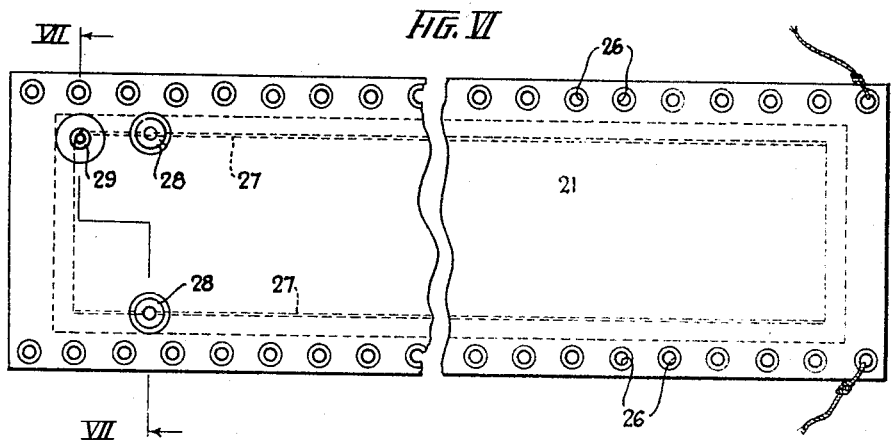
FIG. VI
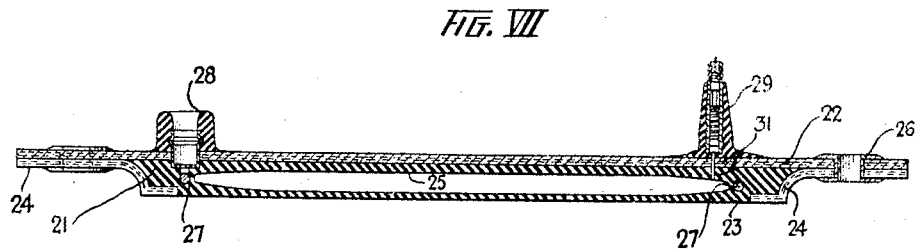
FIG. VII
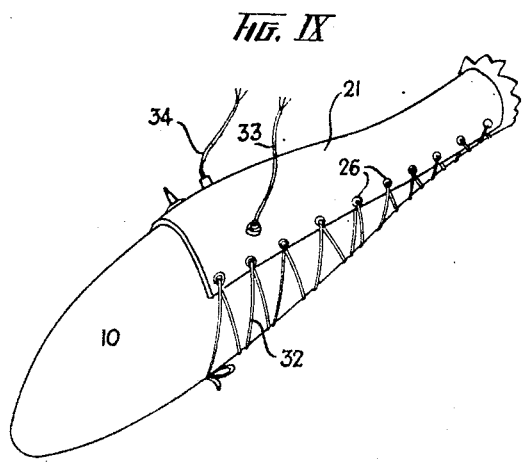
FIG. IX
Inventor
ROY W. BROWN
By
Attorneys

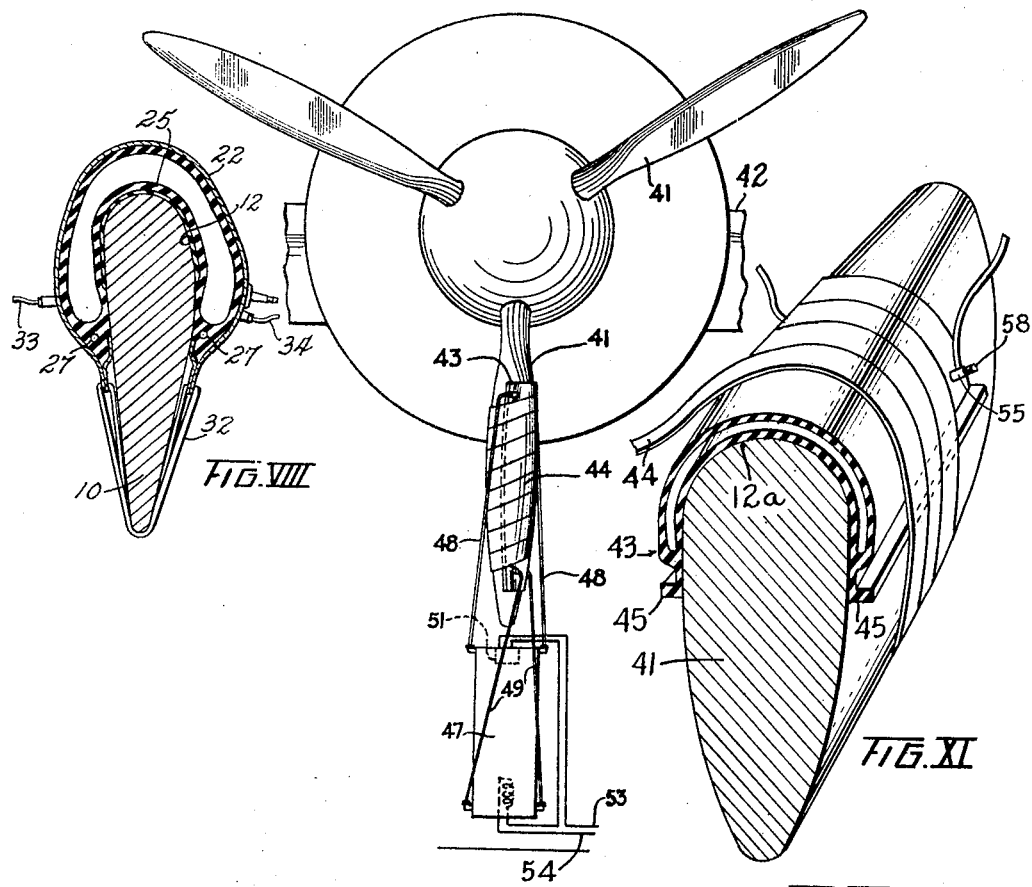
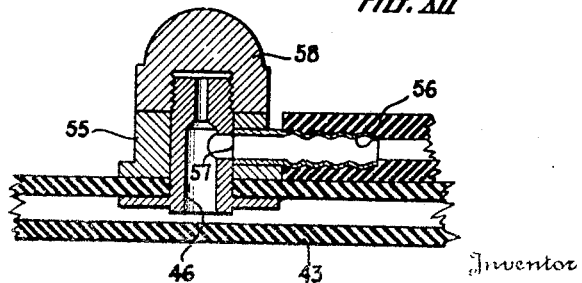

Patented July 10, 1951

2,560,026

UNITED STATES PATENT OFFICE 2,560,026

METHOD OF ATTACHING AIRPLANE PROPELLER DEICER SHOES

Roy W. Brown, Akron, Ohio, assignor to The Firestone Tire & Rubber Company, Akron, Ohio, a corporation of Ohio Original application June 11, 1941, Serial No. 397,650. Divided and this application June 8, 1945, Serial No. 598,366

2 Claims. (Cl. 154—41)

1

This invention relates to airplane propeller deicers generally, and more especially it relates to improved methods of attaching deicer shoes, to airplane propeller blades.

It obviously is necessary to secure very tight and thorough adhesion between the deicer shoe and the propeller blade due to the severe air stresses to which the deicer shoe is subjected, since such pressures would tear the shoe from the propeller unless uniform and complete adhesion is obtained. The adhesion problem involved is complicated by the irregular and varied contours of propellers. Such contoured surfaces are difficult to work with in that it is hard to obtain a uniform pressure when applying the deicer shoe to the propeller.

One problem involved in attaching deicer shoes to airplanes in service is that the propellers usually have to be removed from the airplane before attaching the deicer shoes thereto. As it takes several hours both to remove a propeller from an airplane and to remount it, such removal is objectionable and for this reason it is highly desirable to secure the deicer shoe to the propeller while same is on the plane.

In the types of deicer shoes now in service, some difficulty is encountered in retaining deicer fluid in the deicer shoe until such fluid is moved radially outwardly of the propeller the desired distance.

The general object of the present invention is to provide a novel and improved method of mounting a deicer shoe on a propeller.

Another object of the invention is to provide a facile, expeditious, and inexpensive method for securing deicer shoes to airplane propellers when said propellers are mounted on an airplane.

The foregoing and further objects will be manifest as the specification proceeds, the invention being described with particular reference to the accompanying drawings, in which:

Figure I is an elevation of a propeller having deicer shoes of the invention secured thereto;

Figure II is a fragmentary perspective view of a propeller showing one step in the process of securing the deicer shoe thereto;

Figure III is an enlarged fragmentary sectional view taken on line III—III of Figure II;

Figure IV is a plan of a deicer shoe embodying the invention;

Figure V is a sectional view taken on line V—V of Figure IV;

Figure VI is a plan of pressure apparatus used in securing a deicer shoe to a propeller;

2

Figure VII is a sectional view taken on line VII—VII of Figure VI;

Figure VIII is a sectional view showing the manner in which the pressure bag of Figure VI is secured to propeller;

Figure IX is a perspective view further illustrating the manner in which the pressure bag is secured to a propeller;

Figure X is an elevation of another embodiment of heating and pressure apparatus of the invention showing it attached to an airplane propeller on an airplane;

Figure XI is an enlarged perspective view, partly in section, of the propeller of Figure X; and Figure XII is a detail section of the connecting means for the pressure bag.

This application is a division of my copending application Serial No. 397,650, filed June 11, 1941, now matured to Patent No. 2,381,381, issued August 7, 1945.

Referring in detail to Figure I of the drawings, a propeller 10 of standard construction is shown therein. This propeller 10 is carried on a hub 11 which is adapted to be secured to an airplane motor. Deicer shoes, generally indicated 12 are secured to the leading edges of each half of the propeller 10, which shoes 12 are usually formed from rubber, or synthetic rubber, but other rubber-like, or plastic substances may be used, when suitable. The deicer shoes 12 are initially molded so that they are substantially inverted V shape in section, as shown in Figure V to facilitate mounting them on the leading edge of a propeller. The deicer shoes have tapered edges so that they can be secured to a propeller having a desired airfoil contour without materially changing same. Of course, the deicer shoes 12 may be positioned in recessed regions of the propeller 10 but the shoes are so thin that they do not materially interfere with the air flow characteristics of a propeller that has been entirely preformed before securing the deicer shoe thereto.

Figure IV best shows that a plurality of longitudinally extending grooves 13 are formed in the deicer shoe 12 at the base or hub end thereof. One groove 13a is centrally positioned in and extends the length of the deicer shoe whereas the remaining grooves are formed in corresponding positions on opposite sides of the central groove 13a and converge theretoward. The grooves extending less than the entire length of the shoe 12 are connected to the central groove 13a by angularly positioned grooves 14, each of which extends between the end of one of the grooves 13 and the groove 13a. The grooves 14 are so positioned on opposite sides of the groove 13a as not to intersect the groove 13a at the same place but so that such points of intersection are offset. The grooves 13 and 14 all have parallel edges or side walls, as initially molded. However, when the deicer shoe is secured to the propeller 10, which has a substantially cylindrical hub portion, the deicer shoe tends to be flattened out in the portion thereof overlying the cylindrical portion of the propeller 10. By such deformation of the inverted V-shaped deicer shoe, the central groove 13a thereof has its side walls deflected inwardly toward each other from the base of the groove so that the walls converge toward their upper edges. The converging walls of the groove 13a adjacent the hub of the propeller greatly facilitate retention of deicer fluid in the groove while still permitting ready radial flow of the fluid. As the propeller progressively becomes blade-like toward each outer end with the leading edge becoming relatively sharp it will be seen that the angular shoe applied thereto becomes less obtuse, until a point is reached where the sides of the V-shaped shoe will be drawn toward each other to form an acute angle when the shoe is applied to the propeller as illustrated in Fig. II. While the walls of the central groove 13a will converge toward their upper edges at the hub portion of the propeller, it will now be seen that this convergence progressively changes into divergence as the leading edge of the propeller becomes sharper than the V shape of the shoe. A sump, or liquid collecting recess 15 is formed in the hub end of the deicer shoe 12 and in operation suitable means (not shown) are associated with the propeller for depositing deicer fluid into the sump. Centrifugal force then moves the deicer fluid radially through the grooves 13 and 13a so that the deicing action is exerted over the length of the deicer shoe and over the surface of the propeller when the fluid spills out of the groove.

Ordinarily the deicer shoes 12 are best applied to the propeller 10 by cementing them thereto. A rubber cement or other suitable adhesive, which is compounded so as to secure adequate adhesion, is applied to the leading edges of the propeller 10 and to the premolded deicer shoe 12, and the latter applied to the cemented leading edge of the propeller at the hub end thereof and gradually stitched or pressed into engagement with the propeller, as indicated in Figure II. Note that the initial contour of the shoe 12 facilitates its engagement with the propeller. After the deicer shoe 12 is stitched into as tight engagement with the propeller as is possible, the cemented bond is cured under heat and pressure. To this end a pressure boot 21 is mounted on the propeller, which pressure boot comprises an outer flexible but inextensible layer, usually made from rubberized fabric 22 and an inner layer of electroconductive rubber 23. The edges of the electroconductive rubber 23 are reinforced by rubberized fabric 24. An air tight chamber 25 is formed within the boot 21, which chamber extends the length thereof. A plurality of apertured rivets 26 are secured to the longitudinally extending edges of the boot 21 to facilitate securing same to a propeller, or other contoured surface with which it is to be used. The electroconductive rubber 23 has longitudinally extending electric conductors 27 embedded therein, in order to establish a uniform electrical potential within the rubber. Socket means 28 are connected to each of the conductors 27 at one end thereof and are integrally bonded to the pressure boot 21 whereby a suitable source of electrical energy can be connected to the pressure boot. A valve 29 also is secured to the pressure boot and connects to the chamber 25 through a conduit 31 formed in the pressure boot. In use of the pressure boot 21, a cord 32, or other desired element, is threaded through the rivets 26 in the opposite edges of the pressure boot and then the cord 32 is tightened in order to secure the flexible pressure boot to the irregular and varied contour of the propeller. After the pressure boot is laced into tight engagement with the propeller, chamber 25 is inflated as shown in Figure VIII in order to force the confronting surface of the boot tightly and uniformly against the deicer shoe 12 and force the latter tightly against the propeller. Then suitable electric conductors 33 and 34 are connected to the sockets 28 and electric current is passed through the electroconductive rubber 23, which is compounded in any suitable manner to facilitate passage of current thereto. This flow of electricity through the rubber heats same to a relatively high temperature, such as 90° to 100° C. and this heat, adjacent the deicer shoe 12, acts to dry, polymerize, and/or vulcanize the adhesive applied to the propeller to secure a permanent bond between the deicer shoe and the propeller.

Figures X, XI and XII illustrate the manner in which modified heating and pressure apparatus of the invention are used. In this instance, a triblade propeller 41 is mounted on an airplane 42 and a deicer shoe 12a is to be secured to the leading edge of one blade of the propeller 41. An inflatable, flat, pressure bag 43, usually made from rubber, or rubberized fabric, is secured to the propeller 41 by a strip 44 of any suitable wrapping material. The bag 43 has integral, longitudinally extending ribs 45 formed thereon at the edges thereof and the strip 44 bears against them to press the bag tightly against the shoe 12a and it, in turn, against the propeller 41. Tubular stems 46 are integrally secured to the bag 43 adjacent the corners thereof, which stems extend into the bag and connect to the chamber therein. A portable electric boiler 47 is connected to the bag 43 by flexible conduits 48, 48 extending from the upper end of the boiler and by conduits 49, 49 extending from the lower end of the chamber. The conduits 48 connect to the steam chamber of the boiler, while the conduits 49 connect to the liquid collecting zone of the boiler. Then steam is introduced into the bag 43 by conduits 48, which are connected to the upper end of the bag, and condensate, or cooled steam is withdrawn from the bag by conduits 49. In order to build up pressure in the bag 43 and control flow of steam therethrough, a thermostat 51 is associated with the boiler. The thermostat is connected in lead 53 of the leads 53 and 54 that supply the boiler 47 with electrical energy. The thermostat 51 turns on and shuts off the electric supply and thus maintains the steam pressure and temperature within the pressure bag 43 to the desired values.

The conduits 48 and 49 are connected to the tubular stems 46 by fittings 55 that slip therearound. The fittings 55 include nipples 56, which extend into the conduits, and which line up with holes 57 formed in the sides of the stems 46. Cap nuts 58 engage with the ends of the tubular stems and secure the fittings in position by forcing them against the bag.

The boiler 47 may be merely suspended from the propeller, or it may be supported on the ground but, in all events, the boiler and pressure bag are a readily portable complete unit for adhering deicer shoes to airplanes.

By practice of the invention a deicer shoe can be secured to an airplane propeller, when it is on a plane, in a much shorter time than by previous practise. Prior methods and apparatus also required removing the propeller from the plane. It will be apparent that the varied contour of a propeller makes it difficult to secure a deicer shoe thereto but that the apparatus disclosed herein overcomes this difficulty.

It will be seen that the means used to apply a deicer shoe to a propeller is small, light weight, and easily handled, so that it can be transported readily, and can be used to secure a deicer shoe to an airplane propeller while it is mounted upon an airplane. Then too, the contour of the deicer shoe is such that it adapts itself readily to engagement with the leading edge of a propeller and this also facilitates mounting same under adverse conditions.

It will be appreciated that the pressure bags 21 and 43, and the heating means associated therewith, are interchangeable, and also that the separate features of such apparatus, as the ribs 45, also may be used on the other pressure bag.

The detailed description of the particular embodiments of the invention illustrated and described herein are not to be construed as limiting the invention thereto. The invention includes the features of patentable novelty residing in the foregoing description and accompanying drawings as set forth in the appended claims.

What is claimed is:

1. That method of securing a deicer shoe to a propeller comprising the steps of molding and vulcanizing said shoe into a substantially inverted V shape in section, covering a portion of the leading edge of the propeller with a vulcanizable cement, applying vulcanizable cement to the attaching surface of said shoe, applying the shoe to said propeller beginning at the hub portion and continuing the application progressively radially outwardly of the propeller with said cemented surfaces in contact, lacing an inflatable pressure boot to said propeller in such a manner that said boot completely overlies said shoe, inflating and heating said boot whereby said cement is vulcanized under pressure and said shoe is permanently atached to the propeller.

2. That method of securing a deicer shoe to a propeller comprising the steps of molding and vulcanizing said shoe into a substantially inverted V shape in section, covering a portion of the leading edge of the propeller with a vulcanizable cement, applying vulcanizable cement to the attaching surface of said shoe, applying the shoe to said propeller with said cemented surfaces in contact, fastening an inflatable pressure boot to said propeller in such a manner that said boot completely overlies said shoe, inflating and heating said boot whereby said cement is vulcanized under pressure and said shoe is permanently attached to the propeller.

ROY W. BROWN.

REFERENCES CITED

The following references are of record in the file of this patent:

UNITED STATES PATENTS

| Number | Name | Date |
| --- | --- | --- |
| 1,806,861 | Owen | May 26, 1931 |
| 2,065,613 | Russo | Dec. 29, 1936 |
| 2,138,620 | Strange | Nov. 29, 1938 |
| 2,201,706 | Sukohl | May 21, 1940 |
| 2,331,296 | Bendix | Oct. 12, 1943 |
| 2,334,118 | Morse et al. | Nov. 9, 1943 |
| 2,406,367 | Griffith et al. | Aug. 27, 1946 |
| 2,407,528 | Antonson | Sept. 10, 1946 |

FOREIGN PATENTS

| Number | Country | Date |
| --- | --- | --- |
| 412,300 | Great Britain | June 28, 1934 |